UNITED STATES PATENT OFFICE.

CHARLES E. HITE, OF PHILADELPHIA, PENNSYLVANIA, ASSIGNOR, BY MESNE ASSIGNMENTS, TO AMERICAN BRIQUET COMPANY, A CORPORATION OF DELAWARE.

BRIQUET AND METHOD OF MANUFACTURING THE SAME.

1,290,992.  Specification of Letters Patent.  Patented Jan. 14, 1919.

No Drawing.  Application filed April 17, 1917. Serial No. 162,745.

*To all whom it may concern:*

Be it known that I, CHARLES E. HITE, a citizen of the United States, residing at Philadelphia, in the county of Philadelphia, State of Pennsylvania, have invented a new and useful Briquet and Methods of Manufacturing the Same, of which the following is a specification.

My invention relates to improvements in briquets and the method of manufacturing the same; the object is to provide an improved binder, an improved method of forming the same and improved method of forming therewith a thoroughly commercial briquet.

It has been attempted to produce a binder for the manufacture of briquets from coal dust, culm slack and the like, by the use of numerous substances among which may be enumerated tar, asphaltum, crude oil or residues therefrom, also of materials containing starch.

The chief objection to these various attempts has been the large percentage of tar or asphaltum used which has made the product impractical because of the smoke resulting in burning the same, and also because of the cost of the materials.

The present invention comprises a product containing a minimum amount of starch and asphalt or reduced petroleum per ton of coal, or other powdered or granulated material which is made possible by the improved method of combining the components.

This application is a continuation, in part, of application Serial No. 633,787, filed June 17, 1911.

The following is an example of the method of forming the briquets in accordance with my invention.

One part of corn starch or wheat flour or other amylaceous material or carbohydrate substance is added to twelve parts of water at any temperature, and thoroughly mixed. This mixture is then brought to the boiling point by means of live steam jets or by steam jacketing the container. As soon as the mixture reaches the temperature of about 212°, the starch granules burst and a thick translucent paste is produced. To this paste is then added melted asphaltic pitch, the residuum from the distillation of petroleum or, in other words, a hydro-carbon substance which is solid at ordinary temperatures, in the approximate proportion of two parts asphalt to one part of the starch. This asphalt or reduced petroleum is beaten into the paste with fast revolving paddles. This action causes a breaking up of the hot asphalt into minute particles, which are distributed through the starch paste producing a very smooth chemical emulsion. This emulsion is now brought to a mixing vessel where it is mixed with dry coal dust, such as anthracite culm, or other powdered or granulated material, in the proportion of about 8% of emulsion. The thorough mixing of the coal dust and emulsion is accomplished by means of a system of paddles and scrapers.

The resultant plastic mass is then conveyed to the press, for example a briquet press of the simple roll type, where it is compressed into briquets weighing about two ounces each. The briquets are then subjected to a suitable drying process as for example:

From the press the briquets are conveyed to a drying oven where the six per cent. moisture incorporated with the material through the emulsion is substantially removed. Here they are distributed about six inches deep over a slowly moving screen conveyer which passes through a tunnel built of hollow tile. Through this tunnel and up through the layer of briquets a current of air is drawn by an exhaust fan. The air is heated to a temperature of about two hundred and twelve degrees or more by a simple furnace in communication with the tunnel. The speed of the screen conveyer is such that the briquets are in the tunnel about one hour before they are discharged into an elevator which carries them to the storage bins.

No preparation of the material to be briqueted is necessary other than the removal of excess moisture, which is done by passing it through a rotary drier, nor is any excess degree of temperature required in making the binder or in drying the briquets. Steam of sufficient temperature to boil the starch solution and melt the asphalt is all that is required. A temperature in the drier of slightly over 212 degrees Fahrenheit is sufficient to evaporate the moisture from the briquets.

Since only approximately 8% of the emulsion is used with each ton of material to be briqueted, and of this emulsion approximately ½% is starch and 1% is asphalt, the cost of the emulsion or binder used per ton of material to be briqueted is at the present prices of starch or asphalt, approximately fifty cents. This estimate is based on the present abnormal cost of starch; $64 per ton, and asphalt $17.50 per ton.

What I claim is:—

1. The art of forming briquets which consists in mixing with the material to be briqueted a binder comprising an emulsion made by mixing a carbohydrate substance with water, heating and stirring to form a paste, and mixing directly with this paste a hydrocarbon substance which is solid at ordinary temperatures, and then forming the mass into briquets.

2. The art as defined in claim 1, in which the moisture is removed from the briquets.

3. The process which consists in forming an emulsion, for briqueting coal or similar material, in approximately the following proportions to a ton of coal, mixing one-half per cent. starch with six per cent. water, heating and stirring the mixture until the starch granules burst thereby forming a paste, adding thereto one per cent. of residuum from the distillation of petroleum and thoroughly beating the same together to form the emulsion.

4. The process which consists in forming an emulsion, for briqueting coal or similar material, in approximately the following proportions to a ton of coal, mixing one-half per cent. starch with six per cent. water, heating and stirring the mixture until the starch granules burst thereby forming a paste, adding thereto one per cent. of residuum from the distillation of petroleum and thoroughly beating the same together to form the emulsion, mixing the emulsion with powdered coal, culm or similar substance, in the approximate proportion of eight per cent. emulsion, to form a plastic, forming the plastic into briquets, and passing the briquets through a mechanical drier to remove the moisture therefrom.

5. A briquet formed of powdered coal, culm or similar substance, thoroughly mixed with an emulsion in the approximate proportion of eight per cent. emulsion, said emulsion formed of approximately one part starch to twelve parts water brought to a temperature sufficient to burst the starch granules and thereby form a paste, said paste being mixed with residuum from the distillation of petroleum in the approximate proportion of two parts residuum to one part starch, thoroughly beaten together, the resultant plastic substance being formed into briquets and the moisture removed therefrom by a mechanical drier.

CHARLES E. HITE.